Patented Apr. 17, 1923.

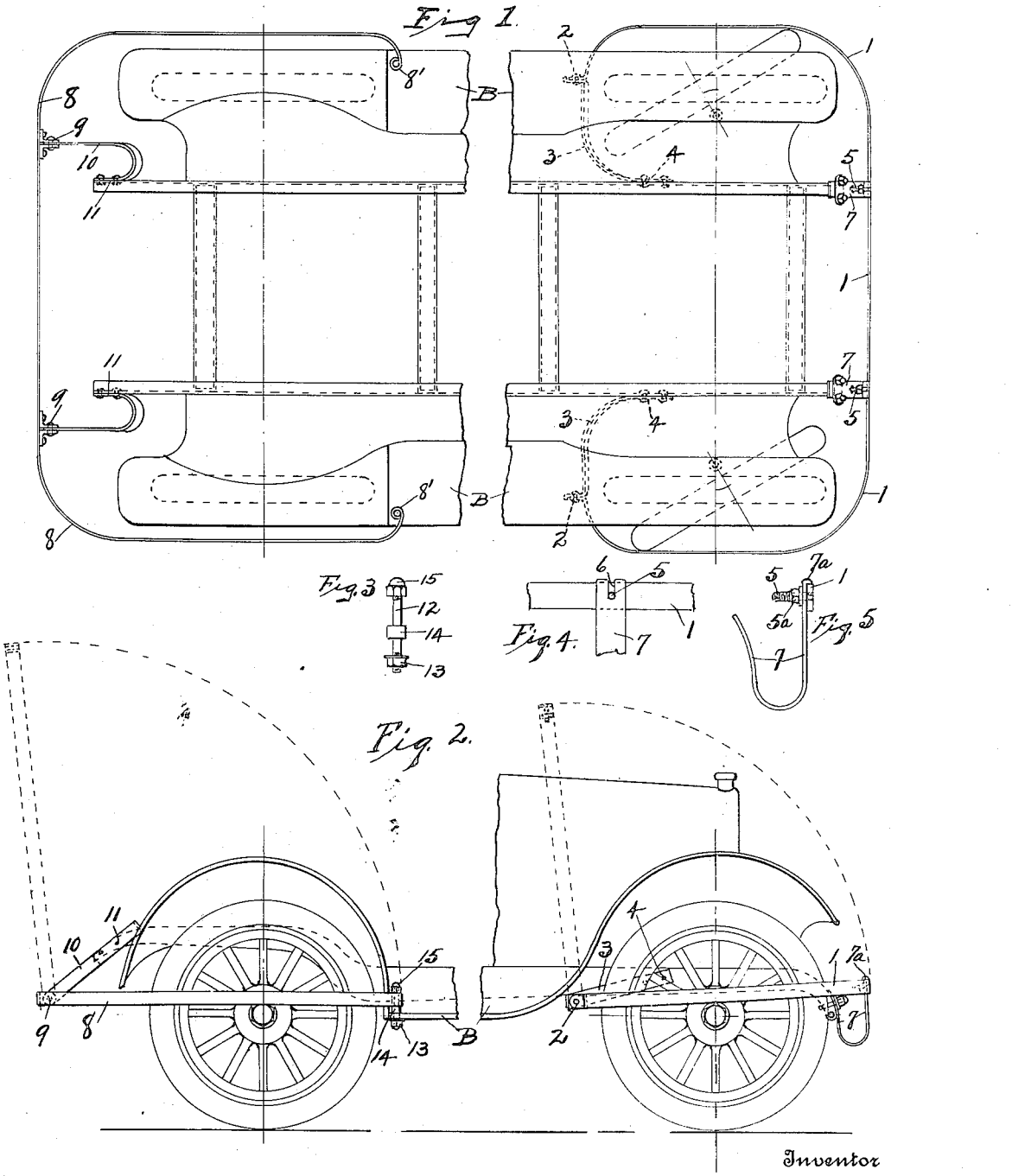

1,452,189

UNITED STATES PATENT OFFICE.

EMIL CHRISTENSEN, OF PORTLAND, OREGON.

AUTOMOBILE GUARD AND BUMPER.

Application filed May 7, 1921. Serial No. 467,711.

*To all whom it may concern:*

Be it known that I, EMIL CHRISTENSEN, a citizen of the United States, residing in the city of Portland, county of Multnomah, and State of Oregon, have invented certain new and useful Improvements in Automobile Guards and Bumpers, of which the following is a specification.

My invention relates to a combination guard and bumper for automobiles, and has for its principal object to provide a guard and bumper which will function as a bumper in front and in the rear of an automobile, and which will also function as a guard or protecting means at the opposite sides of an automobile for the purpose of protecting the fenders at the front and rear.

Another object of the invention is to provide such a combination guard and bumper which can be readily lifted out of the way, when it is desired to remove a wheel, or change a tire.

My improved guard and bumper not only presents a protecting means for preventing injury by collision, but prevents machines from being hooked or interlocked together, as sometimes happens.

In order to further explain my invention, I have shown one practical embodiment thereof on the accompanying sheet of drawings, which I will now describe.

Figure 1 is a top plan view of the necessary parts of an automobile, with my invention applied thereto, the middle part of the machine being broken away to reduce the size of the figure;

Figure 2 is a side elevation of the same;

Figures 3, 4 and 5 are details.

Referring in detail to the drawings, my invention as here shown for illustrative purposes, comprises a front guard member, 1, extending across the front of the machine and rearwardly at the opposite sides thereof, as shown. The ends of said member, 1, are pivotally secured as at 2, 2, to spring members, 3, 3, secured to the frame of the automobile, as at 4, 4. The front of the guard member 1, is provided with two studs, 5, 5, adapted to fit into two open slots, 6, 6, in two spring supporting members, 7, 7, secured to the automobile frame. The upper ends of the supporting members, 7, 7, are provided with hook-like heads, 7ª, 7ª, which hook over the top edge of the guard member 1, as shown in Fig. 5, and the stud 5, is provided with a nut 5ª, to prevent detachment of the guard member, 1 from the supports, 7, 7, accidentally. When it is desired to lift the front guard member 1, as indicated in dotted lines, Fig. 2, it is only necessary to loosen the nut 5ª, at each guard supporting member, 7, sufficiently to permit the support, 7, to be sprung inwardly to release the guard member 1, and it can be raised, as shown, turning on its pivotal connection, at 2, to the member 3.

The rear guard member and bumper member is designated 8, and is pivotally connected at two places, 9, 9, to two supporting members 10, 10, secured to the rear ends of the frame members, as at 11, 11, said supporting members being shown as turned downwardly, Fig. 2. The forward ends of said guard member 8, are secured to bolt members, 12, Fig. 3, secured to the running board, as shown. Each bolt 12 has a nut on its lower end and a sleeve or collar, designated, 13 and 14, respectively, whereby it is secured to the running board, B. The upper end of said bolt is provided with a removable nut, 15, which screws down over the eye, 8', in each end of the rear guard member 8.

Thus in order to raise the rear guard member 8 out of the way, as indicated in dotted lines, Fig. 2, it is only necessary to remove the nuts, 15, 15, from the bolts 12, 12, and the forward ends of the rear guard member can be raised, as indicated, turning on their pivot connections at 9, 9.

Thus the two guard members protect the front and rear ends of an automobile, at the sides of the wheels and fenders, as well as in front and in the rear.

I do not limit the invention to the details shown for illustrative purposes, except as I may be limited by the hereto appended claims.

I claim:

1. In combination with an automobile, a guard and bumper comprising a structure having a cross portion extending across the end of the automobile and side portions extending along the sides of the automobile, said structure being pivotally supported at two places and detachably supported at two places, said cross and side portions being adapted to be turned together on the pivot connections to raise said side portions to vertical positions and out of the way.

2. A combination bumper and guard for automobiles comprising a bale like structure the middle portion of which extends across the end of an automobile and the sides of which extend along the opposite sides of the automobile, two pivotal supports and two detachable supports for said structure, and means whereby said bale like structure as a unit can be turned about the pivotal supports to a vertical position.

3. Combination guard and bumper members, each having a middle portion adapted to extend across the end of an automobile and having its ends turned to extend along the opposite sides thereof, supporting members pivotally connected to said guard and bumper members and adapted to be secured to an automobile frame, and means for detachably holding said guard and bumper members at other places on the automobile.

4. A combination guard and bumper member for automobiles, comprising a member having its middle portion adapted to act as a bumper and extending across the end of an automobile and its opposite ends bent to extend along the opposite sides of said automobile and along the sides of the opposite wheels, supporting members attached to the frame members of the automobile and to said guard and bumper member, and means pivotally connecting said guard and bumper member at other places to said automobile, whereby it can be raised from a horizontal position to a vertical position, for the purpose indicated.

5. In combination with an automobile, a front guard and bumper member extended across the front of an automobile and around at its opposite ends along the opposite sides of said automobile, means pivotally connecting said ends to fixed parts of the automobile, means in front of said automobile yieldingly supporting said bumper member and detachably holding the same, and a rear guard and bumper member comprising a member pivotally connected and supported at the rear of the automobile and having its opposite ends extended forwardly along the opposite sides of the automobile, and means detachably securing said opposite ends to fixed parts of the automobile, whereby said guard and bumper members can be raised on their pivotal connections from horizontal to vertical positions, substantially as described.

Signed at Portland, Multnomah County, Oregon, this 28th day of April, 1921.

EMIL CHRISTENSEN.

Witnesses:
E. F. CATHRO,
E. W. THOMPSON.